(12) United States Patent
Franck et al.

(10) Patent No.: US 9,787,426 B2
(45) Date of Patent: Oct. 10, 2017

(54) SYSTEM ARCHITECTURE FOR MANAGING RESOURCES IN A COMMUNICATION NETWORK

(71) Applicant: THALES, Courbevoie (FR)

(72) Inventors: Bertrand Franck, Gennevilliers (FR); Dominique Merel, Gennevilliers (FR)

(73) Assignee: THALES, Courbevoie (FR)

(*) Notice: Subject to any disclaimer, the term of this patent is extended or adjusted under 35 U.S.C. 154(b) by 0 days.

(21) Appl. No.: 14/941,424

(22) Filed: Nov. 13, 2015

(65) Prior Publication Data

US 2016/0142173 A1 May 19, 2016

(30) Foreign Application Priority Data

Nov. 14, 2014 (FR) ..................... 14 02559

(51) Int. Cl.
| | |
|---|---|
| *H04K 3/00* | (2006.01) |
| *H04L 29/06* | (2006.01) |
| *H04W 12/12* | (2009.01) |
| *H04B 1/713* | (2011.01) |
| *H04W 4/02* | (2009.01) |
| *H04W 84/18* | (2009.01) |
| *H04B 1/00* | (2006.01) |

(52) U.S. Cl.
CPC .............. *H04K 3/80* (2013.01); *H04B 1/713* (2013.01); *H04K 3/86* (2013.01); *H04L 63/1408* (2013.01); *H04W 4/021* (2013.01); *H04W 12/12* (2013.01); *H04B 1/0003* (2013.01); *H04L 63/30* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 4,334,322 A | * | 6/1982 | Clark, III ............... | H04K 3/226 380/34 |
| 2006/0009295 A1 | * | 1/2006 | Song ......................... | F16D 3/12 464/66.1 |
| 2009/0259449 A1 | * | 10/2009 | Franck ................ | G06F 17/5009 703/6 |

(Continued)

FOREIGN PATENT DOCUMENTS

GB      2 061 671 A      5/1981

*Primary Examiner* — Mohammed Rachedine
(74) *Attorney, Agent, or Firm* — Baker & Hostetler LLP

(57) ABSTRACT

A system architecture for managing resources in a communication network comprises in combination at least the following elements: a plurality of radio equipments working in a given frequency band and with identical frequency hopping rules; the radio equipments are managed by a master device; and a radio equipment comprises at least: a radiocommunication module that carries the radiocommunications; a module suitable for tapping, monitoring and intercepting radio signals in the environment and for recording them locally in a database; a module suitable for disrupting non-authorized communications; and a local "3 in 1" management module receiving the orders emitted by the master device, the management module being suitable for controlling the various modules of the radio equipment; a radio-router module; and a tapping and monitoring module.

7 Claims, 3 Drawing Sheets

(56) References Cited

U.S. PATENT DOCUMENTS

2011/0086614 A1* 4/2011 Brisebois ................. H04K 3/42
                                                        455/411
2011/0183602 A1* 7/2011 Tietz ....................... H04K 3/45
                                                        455/1

* cited by examiner

SYSTEM ARCHITECTURE FOR MANAGING RESOURCES IN A COMMUNICATION NETWORK

CROSS-REFERENCE TO RELATED APPLICATION

This application claims priority to foreign French patent application No. FR 1402559, filed on Nov. 14, 2014, the disclosure of which is incorporated by reference in its entirety.

FIELD OF THE INVENTION

The invention relates to a system architecture for managing resources in a communication network of ad-hoc type intended for the conduct of tactical and mobile military operations or safety (voice, data of command or reporting), comprising radios with "3 in 1" capacities, as defined below.

BACKGROUND

An equipment of radiocommunication equipment integrating "2 in 1" or "3 in 1" multifunction capacities distributes all the time and frequency resources that are allocated thereto between various services, programmed in a software way, notably:

1) for its main function, communication services (voice, data, operational messaging, alarms, SMS, etc.);

2) services 1), called "2 in 1" services, that are additional to 1) and derivatives of reception/tapping capacities of the radio, namely services such as tapping, monitoring, recording of I/Q channels, positioning, cyclic channel checking, and spectrum studying;

3) services, called "2 in 1" services, that are additional to 1) or services, called "3 in 1", that are additional to 2) and derivatives of the capacities of the radio emitter, namely services allowing proximal signals and radiocommunications to be disrupted.

Below, for reasons of simplicity, an additional service added to the conventional 1) function of a radio post, whether this be a service such as an ESM (Electronic Support Measure) electronic measure, a signal disruption service, or a listening or tapping/monitoring/positioning service, or the spectrum management service known as dynamic spectrum management (DSM), will be referred to as a "3 in 1".

In known prior-art systems used to listen, tap, monitor, intercept and localize emitters, the signal-detecting means enabling these functions are dedicated means that are limited in number. These means are in general dedicated to one task or one tapping(listening)/monitoring or disruption function and are de facto positioned in suitable locations, depending on the application. They are not always well orientated as regards their reception antennae and their position or location, relative to the device or event to be detected. For example, they may have an angular aperture that is inadequate to obtain a quality position reading, or they may not be positioned in geographical proximity to the emitters of interest in question. The means implemented in such systems often require the installation of additional cabinets, leading to integration, cabling, bulk, weight and electricity consumption costs that notably decrease the mobility of the units so equipped (deployment of antenna masts for the radio transceivers, determining antennae heading or direction, cables to be installed between cabinets and antennae). The equipment being dedicated to specific processes, it in general provides optimized results for these processes, but is not necessarily reusable for other applications.

Among the drawbacks of the prior art, mention may be made of: a device position that does not necessarily correspond to the targets in the absence of prior knowledge of the environment (i.e. emitters of interest, etc.); a lack of flexibility; and how difficult it is to rapidly reposition one or more elements when they are in operation and dedicated to one function, the presence of antennae and supporting masts meaning that an adjustment is necessary. In contrast, "3 in 1" equipment may be used to provide services that are rapidly reconfigured, notably by virtue of the software-defined radio (SDR) capacity of communication network radios.

SUMMARY OF THE INVENTION

One of the objectives of the present invention is to provide a system architecture that enables flexibility in the use of the resources of the system, in the positioning of the resources and in the tasks to be accomplished, depending on requirements expressed by a user.

Present invention concerns a programmed software radios network, capable of activating software modules which can endow the radio of additional services to the main service of communication of tactical command, always active. These software modules will be activated on the most relevant radios of the network for the considered service, for example, proximity of threat, optimization of the bandwidths of the communication network for a require quality of service. Several modules can be called in parallel to assure different interlacing services in time and in geographical distributions. One of the software module is the manager for the interlacing of the services, according to the objectives to be reached.

The invention relates to a system architecture for managing resources in a communication network of ad-hoc type or of security type comprising in combination at least the following elements:

a plurality of radio equipments working in a given frequency band and with identical frequency hopping rules;

the additional "3 in 1" functions provided to the communication network by said radio equipments are managed by a master device;

a radio equipment comprises at least:
  a software module to assure the main mission of radio communication which supports the exchanges on the chain of command, voice, data,
  a software module adapted for tapping, monitoring and intercepting radio signals in the environment and for recording them locally in a database, a module adapted for disrupting non-authorized communications; and a local "3 in 1" management module receiving the orders emitted by the master device, the management module being adapted for controlling the various modules of the radio equipment;
  a software radio-router module, and
  a software tapping and monitoring module.

According to one embodiment, a radio-router module for example comprises a plurality of functional modules, namely a matching/transmission module, a module allowing transmission reliability to be increased, a data transfer module, a routing module, and a local management module receiving data to be stored and then transferred according to criteria and constraints to the master device for data processing.

The tapping and monitoring module for example comprises a radiocommunication module carrying the radiocommunications, a module suitable for tapping, monitoring and intercepting radio signals in the environment and for recording them locally in a database, a module suitable for disrupting non-authorized communications, and a local management module receiving orders emitted by the master device, the management module being suitable for controlling the various modules of the radio equipment.

The master device may comprise:
- a database containing information or data regarding operational and technical constraints;
- a database containing geographical data relating to the distribution of zones of interest;
- a "spectra of interest" database;
- a database containing geographical data regarding receiver geographical positions;
- a database containing communication network topologies;
- a database of exchange flow states;
- an equipment management algorithm; and
- a module for communicating with the radio equipment of the system.

To determine a system architecture, a coefficient K is for example determined such that the performance of the system $Perf_{systdeployment}$ obtained by deploying a plurality of equipments (the performance of each device is $Perf_{equipment}$) is such that $Perf_{systdeployment} = K \cdot Perf_{equipment}$ where K is associated with a strategy for selecting equipments depending on an operational requirement, detected equipment, position, and whether device operation is disrupted.

According to one embodiment, the equipment management algorithm is adapted for programming resources of the most appropriate units in order to optimize conjoint operation of functions for monitoring transmissions, originating from devices or elements, and radiocommunication functions, in a communication network under quality of service QoS and service level agreement constraints.

The system architecture may comprise a plurality of transmission networks networked via nodes providing matching, transferring and routing technical functions to the particular radio networks.

According to one embodiment a radio equipment for example comprises a local clock and the local clocks of equipments present in the system are networked in order to converge to a system time.

BRIEF DESCRIPTION OF THE DRAWINGS

Other features and advantages of the present invention will become more clearly apparent on reading the description, given by way of appended completely nonlimiting illustration, of the figures, which show.

DETAILED DESCRIPTION

Figure 1:
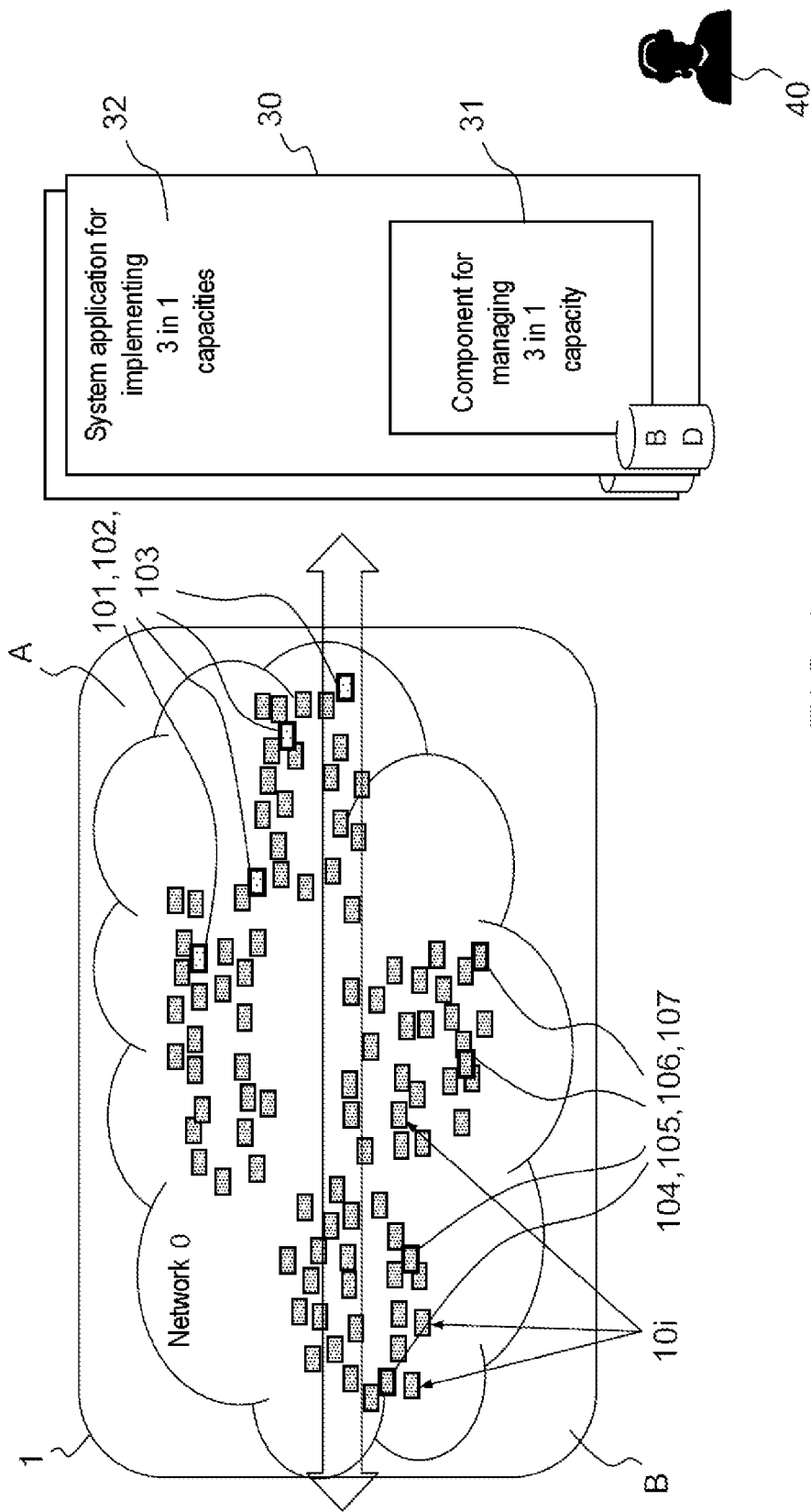
FIG. 1, an exemplary spatial deployment architecture according to the invention.

FIG. 1 schematically shows an exemplary spatial deployment system architecture according to the invention. A transmission network 1 is composed of a plurality of interoperatable radio equipments 10$i$ working in a given frequency band and with identical frequency hopping rules, these radio equipments possibly using identical encryption strategies and the same radio protocol. The radio equipments 10$i$ are notably managed by a master device 30 such as will be described below. A fraction of the resources of the radio equipment attributed to the "3 in 1" services is managed by the master device. The other fraction, corresponding to the resources for the radiocommunication services, continues to be managed by a system dedicated to managing radio capacities, which system may be collocated or not, and be able to rapidly interact or not, with the "3 in 1" master device.

The master device 30 (FIG. 1) for example comprises: a first module 31 for managing capacity of the "3 in 1" radio equipment, which allows the "3 in 1" functionalities of a radio equipment to be monitored, controlled, remotely measured and programmed via a management module 15 (FIG. 3) present in each radio equipment; and an application module 32 (FIG. 1) adapted for implementing "3 in 1" radio capacities, which allows the radio equipment with the most appropriate "3 in 1" capacities, for example geographic proximity to the sought targets, availability of resources, the best topology depending on the function to be carried out, etc., to be selected while preventing any impact on operations already underway (radiocommunications, other "3 in 1" services already initiated) and optimising the performance of the system, for example by initiating operations in parallel on the network or by minimising the duration of operation of the set of radio equipments equipped with a 3 in 1 capacity. The master device 30 selects the most appropriate resources at the radio-equipment level and programs them transparently and depending on the requirements of an application. The master device 30 is programmed by an operator 40, for example.

Figure 2:
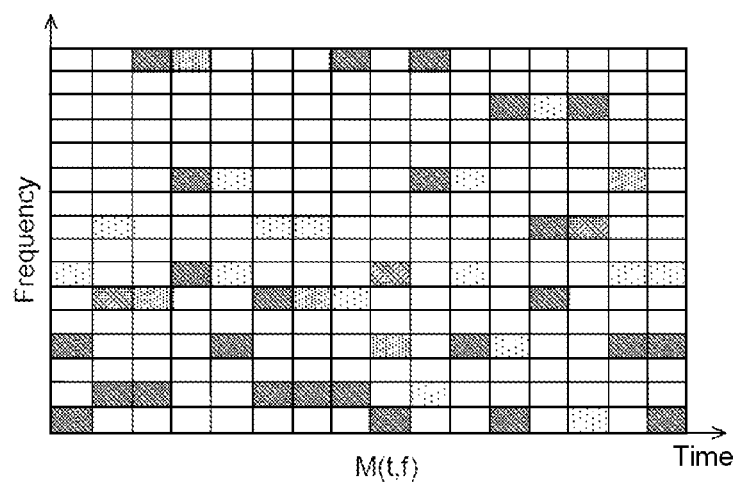
FIG. 2, a representation of the logic channels forming the orthogonal time and frequency resources of a set of radio equipments providing various 3 in 1 services and a corresponding time-frequency matrix.

FIG. 2 shows logic channels carrying various 3 in 1 services, and a corresponding constituent time-frequency matrix M(t, f) of the logic channels, the matrix allowing changes in spectral content to be followed over time. The channels are schematically shown by way of different hatchings and dots in the figure.

Figure 3:
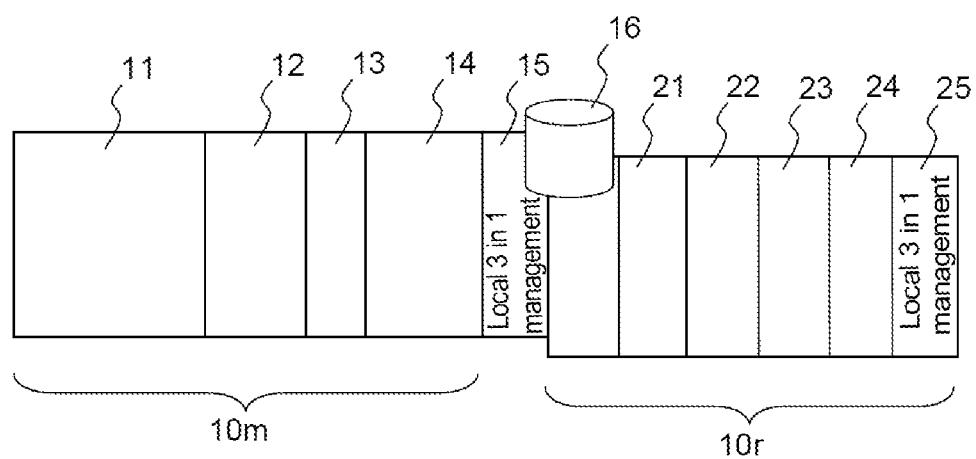
FIG. 3, a functional architecture of a management component, given that distributed agents or components are located in all the constituent radios of the system according to the invention.

FIG. 3 is a functional schematic of the elements participating in the system according to the invention.

A "3 in 1" radio equipment (FIG. 3) comprises, for example, at least the two following modules: a first software module adapted to assure the main mission of radio communication which supports the exchanges on the chain of command, for example, voice, data, command data, reporting, and a second software module adapted to listen to, to watch, to intercept the radio signals of the environment and to register them.

The radio equipment 10$i$ comprises a first software functional module 10$m$ comprising: a first radio transceiver module 11 that carries the radiocommunications (voice, data, messaging, alarms, SMS, etc.); a module 12 or 14 comprising a set of resources, such as, for example, a capacity allowing radio signals in the environment to be tapped, monitored and intercepted; a module 13 adapted for disrupting non-authorized communications or signals (said modules will be managed by the management module 15 that receives orders from the master device 30); and a database 16 for storing information. The management module 15 manages, on the one hand, the conventional radiocommunications carried by this type of equipment (voice, data, messaging, alarms, SMS, etc.), and on the other hand, local resources allocated to the additional services provided.

A radio equipment also comprises a second software module 10r, or radio-router module, adapted for storing data and for routing and transferring data and increasing data transmission reliability between the interfaces of the radio network according to a set of rules. The function of this module is notably to transfer data and programming orders between the master device and the "3 in 1" radio equipment. It consists of a plurality of functional modules: a matching/transmission module 21; a module 22 allowing data transmission reliability to be increased; a data transfer module 23; a routing module 24; and a local "3 in 1" management module 25 receiving data to be stored and then transferred depending on criteria and constraints to the master device for data processing. The transfer criteria and constraints are intended to optimize, increase the fluidity of and parallelize the various exchanges of data within the system, thereby minimising the impact of the additional "3 in 1" services on the conventional radiocommunications (between users) of the radio network.

For example, in FIG. 1, the radio equipment 101, 102, 103 are managed by the master device 30 in order to monitor a zone of interest A, and the radio equipment 104, 105, 106, 107 are managed by the master device 30 in order to monitor a second zone of interest B.

Figure 4:
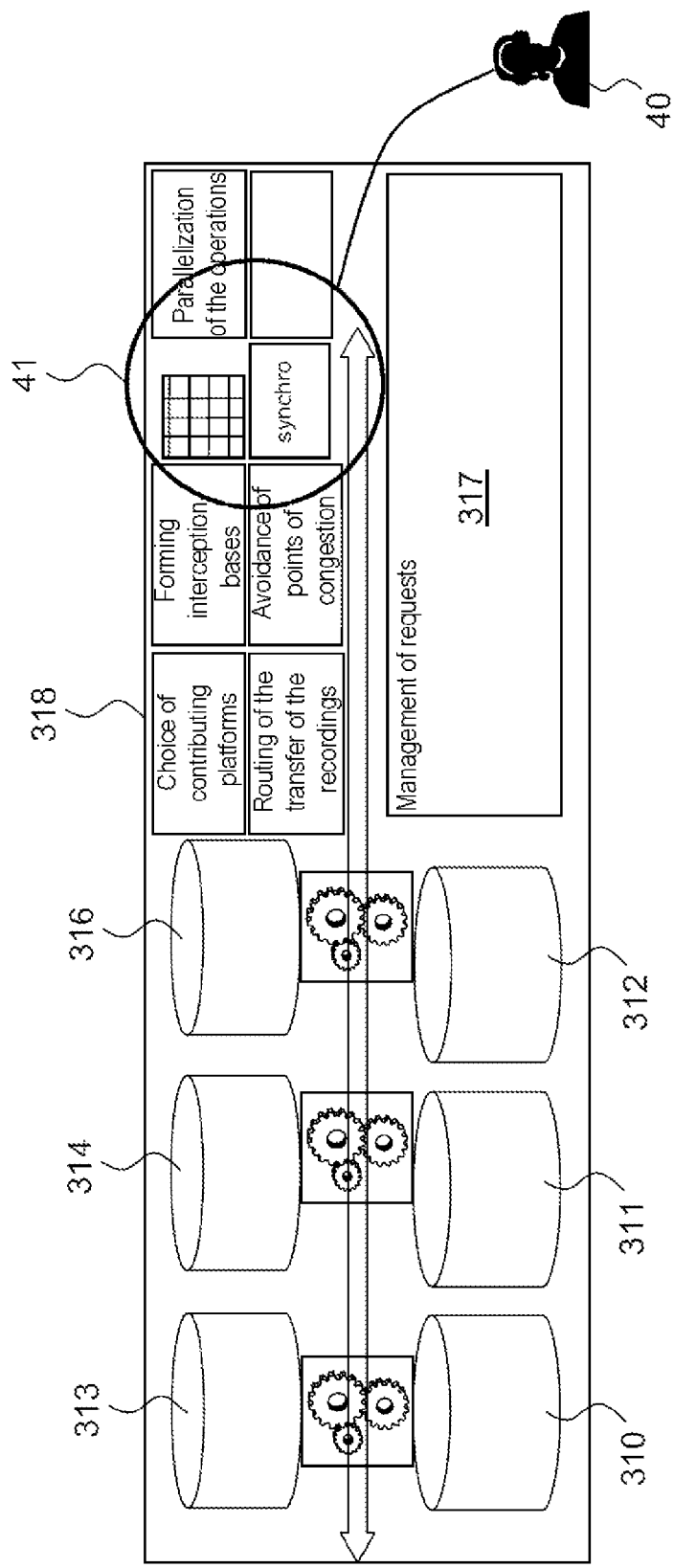
FIG. 4, an exemplary module present in a master station of the network.

The master module 30 possesses the following elements, FIG. 4:
  a database 310 containing information or data regarding operational and technical constraints;
  a database 311 containing geographical data relating to the distribution of the zones of interest;
  a "spectra of interest" database 312;
  a database 313 containing geographical data regarding receiver geographical positions;
  a database 314 containing the communication network topologies;
  a database 316 of exchange flow states;
  an equipment management algorithm 317; and
  a module 318 for communicating with the "3 in 1" radio equipment of the system.

An operator 40 inputs the functional constraints on the system at a given instant, by means of a human-machine interface 41.

The equipment management algorithm 317 is adapted for managing requests, for example: indexing of the 3 in 1 enabled units; exchange (i.e. communications) requirements; function (i.e. positioning, disruption of unauthorized signals, etc.) requirements; and/or monitoring of unit activity levels. Programming of the means of the system notably makes it possible: to system platforms that contribute; to route the transfer of the recordings; to create interception bases; to avoid points of congestion in the system; and to parallelize operations.

The master device notably has the following functionalities:
  guaranteeing quality of service for operational communications (voice, data, messages, alarms, SMS, etc.);
  managing and making available in real time new "3 in 1" services by managing the various radio equipment that must participate in the monitoring of a device (detection, tapping, interception, frequency scanning, scanning of predefined channels, disruption of signals emitted by devices that are not authorized to operate) or that are used to transfer, route and relay measured data to the processing module, a chance to appropriate some of the time/frequency resources of the radiocommunication network to provide additional services arising during operation of the radiocommunication network;
  an algorithm allowing resources of the most appropriate units to be programmed in order to optimize conjoint operation of functions for monitoring transmissions, originating from devices or elements, and radiocommunication functions, in a communication network under quality of service QoS and service level agreement (SLA) constraints;
  a module making it possible to determine the best strategies of use of the "3 in 1" radio capacities, time interleaving, the sensor bases (receivers) with geometries adapted for processing data, geographical proximity, taking into account masking related to relief; and
  a module for optimal management of radio information and network nodes for systems comprising a plurality of connected subnetworks intercommunicating via nodes and via protocols known to those skilled in the art.

The architecture described above applies in the case of transmission networks composed of radio equipments that are interoperatable with the same frequency band, same hopping rules, same encryption elements and same radio protocol and patterns. It may also be used in a network of transmission networks, composed of a plurality of transmission networks that are networked via equipment or nodes notably providing technical matching, transferring and routing functions to the particular radio networks.

Networking and sequencing TMD (tapping/monitoring/disruption) capacities over multifunction radios allows the effect and the performance of the system to be amplified; it is possible to write $\text{Perf(TMD)}_{deployment} = K \cdot \text{Perf(TMD)}_{equipment}$ where Perf represents the performance of an equipment or of the system and where K is a coefficient depending on the equipment selection strategy, the topology of the equipment and parameters associated with a detection, signal disruption, equipment-positioning or technical analysis type strategy. The choice of K may also comprise a strategy for selecting communication relays and bases in order to minimise transfer flows and decrease the end-to-end latency of the processes.

The master device will allow the most appropriate "3 in 1" radio equipment to be chosen, for example: radio equipment that are near a zone of interest, or radio equipments adapted for maximising the aperture length of the angular base in the case where it is being sought to determine the position of a device or for minimising the exchange requirements engendered by new operational chains, for example new services usable to perform an operation (tapping and monitoring services, alarm on detection of radio activity), the functional radio equipment 10m and the network equipment 10r (routing module) making it possible to determine the best routing path for the data obtained by the radio equipment (these data being stored in the equipment programmed to store and transmit data to the master device) in order to prevent network congestion, to use broadband links when they are available, and to parallelize the data exchanges when this is possible. Each node of the network is equipped with these modules 10m and 10r.

According to one variant implementation of the invention, the system consists of a plurality of transmission networks that are networked via nodes or equipment providing, notably, routing, transferring, and matching technical functions to the particular radio networks. Networking and sequencing "3 in 1" capacity notably has the effect of amplifying the effectiveness of tapping, positioning, jamming and dynamic spectrum management performance. The improvement may also be achieved by networking local clocks with which each radio equipment is equipped and convergence towards such a system. The architecture according to the invention also makes system synchronisation of network segments possible, in order to improve the precision of TDOA (time difference of arrival) positioning services, and allows the availability of this type of service to be parallelized without having to maintain an overall synchronisation, which is much more difficult to obtain in a radio network.

According to one variant embodiment, the system allows, without a priori knowledge of an operational context, an approximate situation to be determined in a first step for a snapshot of the devices to be detected, tapped, monitored and positioned (said devices being present in a zone) and then improved in a second pass. In this exemplary use, a first pass is carried out in which a general search is carried out for radio activity in order to map the radio environment. This map is associated with a list of priority objectives that makes it possible to produce a detailed search plan (this search being what is referred to as an "oriented" search) that will optimally and appropriately use the available 3 in 1 resources of the system. Tasks judged to be of lesser priority than others may optionally be abandoned, in order to free up resources to the benefit of others that are judged to be more critical.

For example, in this first step, the master device 30 requests that certain parts of "3 in 1" radio equipment $10i$ measure signals emitted in a frequency band of width BW and at a plurality of given frequencies $F_j$. These data are then recorded and stored in the radio equipment programmed to transfer data to the master device. Next, the master device will process this information in order to determine the position of one or more devices to be monitored, and will then subsequently choose the most appropriate radio equipment for detecting/positioning the signals emitted by one or more devices. The optimisation is based on targeted monitored device/sensor topology criteria, but also on communication-network performance criteria and on the impact on the other "3 in 1" operations that are in the process of being carried out. The equipment base may thus be located as close as possible to the geographic coordinates of the one or more emitters the positions of which are to be determined, and its north-south and east-west orientation will be defined in order to optimize signal detection; the number of equipment radios used will be chosen depending on efficiency criteria specific to each service. It is thus possible to orient the adopted manoeuvre in order to improve the detection, positioning and signal-disruption functional chains.

According to another variant embodiment, the system may comprise a module allowing radio equipment "time" clocks to be corrected. The local system correction is for example applied to segments of the network, for example by choosing a number of radio equipments in a given geographical zone, this zone at least containing the units serving as the sensor base in the case of TDOA-type positioning technique. Decomposition into a plurality of zones advantageously makes it possible to match the topology of the zone to be synchronized to the sensor base. The procedure for correcting radio hours is in fact simpler to carry out when the number of nodes is small. The procedure for correcting radio hours will be simpler to carry out when communication between sensors, required by the network synchronisation protocol, is continuous and reliable and when a large bandwidth is available. This is easier to achieve in geographical zones that are small in size. It is also possible to parallelize the clock corrections of a plurality of segments of the network if necessary. The local clocks of the equipments in each zone are synchronized with one another, but there is no need to synchronize the zones with one another, nor to synchronize equipment located outside said zones. It is possible to improve the performance of the system by networking local clocks and converging towards a system time.

The system according to the invention notably has the advantage of determining, depending on the zones of interest specified by a user, for example, the positions and number of "3 in 1" radio equipments that are most appropriate for providing the requested services without too greatly impacting the operational communication services already being provided by the communication network, or impacting the mobility of the deployment. The system therefore makes it possible to use networked resources dynamically depending on the application while minimizing potential disruptions to the operational communications network, to optimize the use of resources under constraints, and to parallelize operations depending on the topology of the resources and the geographical position of the devices to be detected. The system notably makes it possible to use individual radio resources dynamically, both from a geographical point of view and from a spectral point of view, and depending on the use in question.

The system architecture according to the invention notably makes it possible: to select the units that are most appropriate for providing the services, in order to achieve an optimisation under multiple constraints; to select the unit closest to a zone of interest; to select the best topologies, the choice of sensor bases and the angular aperture in the case of positioning services; and to determine the best strategies of use of "3 in 1" capacities, for example time interleaving, sensor bases with geometries suitable for processing data, and the capacity to transfer gathered data to a "master" unit while minimising network congestion by minimising latencies and network forwarding in order to economize communication resources.

The invention claimed is:

1. A system architecture for managing resources in a communication network of military ad-hoc type or safety type comprising:
   a plurality of radio equipments working in a given frequency band and with identical frequency hopping rules, said radio equipments being software programmed,
   a radio equipment comprises at least two of:
      a software module to assure a main function of radio communication that supports exchanges on a chain of command, voice, and data;
      a software module for tapping, monitoring and intercepting radio signals in a communication environment and for recording the radio signals locally in a database;
      a module adapted for disrupting non-authorized communications;
      a local "3 in 1" management module receiving orders emitted by master device, the "3 in 1" management module being adapted for controlling various modules of said radio equipment;
      a software radio-router module; and
      a software tapping and monitoring module,
   wherein said plurality of radio equipments being managed by the master device for implementing "3 in 1" functions provided to the communication network, said master device configured to select one or more most appropriate "3 in 1" capacities, said "3 in 1" capacities including geographic proximity to sought targets, availability of resources, and best topologies depending on a function to be carried out by the plurality of radio equipments, said master device configured to program the plurality of radio equipments to avoid points of congestion in the system architecture and parallelize an operation of the system architecture, wherein a coefficient K is chosen such that a performance $\text{Perf}_{systdeployment}$ of the system architecture obtained by deploying a plurality of parts of said radio equipment is such that $\text{Perf}_{systdeployment} = K \cdot \text{Perf}_{equipment}$ where K is chosen for selecting communication relays and bases to minimize end-to-end latency of communication using the system architecture, wherein $\text{Perf}_{equipment}$ is a performance of the radio equipment.

2. The system architecture according to claim 1, wherein a radio-router module comprises a plurality of functional modules, including a matching and transmission module, a module allowing transmission reliability to be increased, a data transfer module, a routing module, and a local management module receiving data to be stored and then transferred according to criteria and constraints to the master device for data processing.

3. The system architecture according to claim 1, wherein the software module for tapping and monitoring comprises a radiocommunication module carrying out radiocommunications, a module for tapping, monitoring and intercepting radio signals in the communication environment and for recording the radio signals locally in a database, a module suitable for disrupting non-authorized communications, and a local management module receiving orders emitted by the master device, the management module being configured to control the various modules of said radio equipment.

4. The system architecture according to claim 1, wherein the master device comprises:

- a database containing information or data regarding operational and technical constraints;
- a database containing geographical data relating to a distribution of a zones of interest;
- a database including information regarding communication spectra of interest for said radio communication;
- a database containing geographical data regarding receiver geographical positions;
- a database containing communication network topologies;
- a database of exchange flow states;
- an equipment management algorithm; and
- a module for communicating with the radio equipment of the system architecture.

5. The system architecture according to claim 4, wherein the equipment management algorithm is suitable for programming resources of the most appropriate radio units to optimize conjoint operation of functions for monitoring transmissions, originating from radio devices, and radio-communication functions, in a communication network under quality of service QoS and service level agreement constraints.

6. The system architecture according to claim 1, wherein the system architecture comprises a plurality of transmission networks networked via nodes providing matching, transferring and routing technical functions to particular radio networks.

7. The system architecture according to claim 1, wherein a radio equipment comprises a local clock and local clocks of the radio equipment present in the system architecture are networked in order to converge to a system time.

\* \* \* \* \*